April 22, 1958 R. ADELL 2,831,244
PROTECTIVE TRIM MOLDING FOR VEHICLE DOOR
EDGES AND METHOD OF MAKING THE SAME
Filed June 17, 1955

INVENTOR.
ROBERT ADELL
BY Gregory S. Dolgorukov
ATTORNEY.

United States Patent Office 2,831,244
Patented Apr. 22, 1958

2,831,244

PROTECTIVE TRIM MOLDING FOR VEHICLE DOOR EDGES AND METHOD OF MAKING THE SAME

Robert Adell, Detroit, Mich., assignor to Franklin Z. Adell and Marvin M. Adell, both of Detroit, Mich.

Application June 17, 1955, Serial No. 516,102

1 Claim. (Cl. 29—476)

This invention relates to automobiles and more particularly to an improved ornamental and protective molding for trailing edges of its closures such as doors.

One of the difficulties in making and applying ornamental and protective molding to the edges of closures such as doors was confronted in the necessity of making sharp bends in such moldings. Design of present day automobiles because of various styling and dimensional requirements includes closures such as doors having bends or corners in their trailing edges as sharp as 90 degrees, requiring making a molding bent also at 90 degrees. It has been attempted to make such a corner from two separate pieces of molding meeting at a 90 degree angle. It was found, however, that vibrations due to road rumble, as well as shock in slamming the door, caused slight movement of the molding and separation thereof at the joint, exposing sharp edges and betraying separation of the pieces. Attempts have been made to fit the pieces at a 45 degree angle and solder the joint. It was found, however, that such expedient had many disadvantages. The corner of the molding joint was sharp, and soldered joint proved unreliable as to its strength. On the other hand, welding of such joint was not considered practicable in view of very thin material used for molding and as affecting appearance of the joint.

One of the objects of the present invenion is to provide an improved ornamental and protective molding for trailing edges of vehicles, whereby the difficulties and disadvantages explained above are overcome and largely eliminated.

Another object of the present invention is to provide an improved ornamental and protective molding for automobile doors which molding in spite of being made of relatively thin sheet metal is sufficiently strong at the corner to resist factors tending to cause separation of the molding thereat, and which is smooth and does not betray by its appearance presence of a joint in the corner.

Further objects and advantages of this invention will be apparent from the following description and appended claim, reference being had to the accompanying drawings forming a part of this specification, wherein like reference characters designate corresponding parts in the several views.

Figure 1:
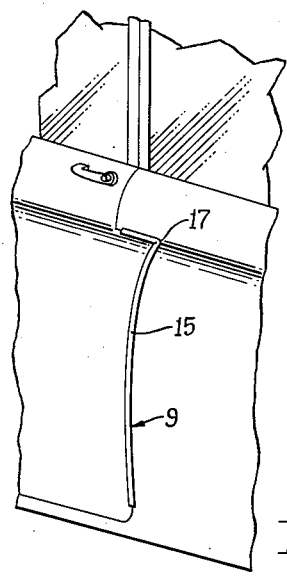
Fig. 1 is a perspective view showing a portion of an automobile body having a door provided with an ornamental and protective molding embodying the present invention.
Figure 2:
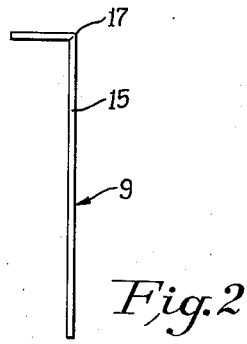
Fig. 2 shows the molding separately and in side elevation.

It is to be understood that the invention is not limited in its application to the details of construction and arrangement of parts illustrated in the accompanying drawings, since the invention is capable of other embodiments and of being practiced or carried out in various ways. Also it is to be understood that the phraseology and terminology employed herein is for the purpose of description and not of limitation.

In accordance with the present invention I discard the former practice of forming a corner in the molding by fitting two separate pieces of molding cut at 45 degree angles. In accordance with the invention I preserve intact the metal at the curved portion of the cross section of the molding. For forming the angle, I notch out wedge shape pieces from the sides of the molding, starting from the edges of its sides toward the curved connecting portion, but leaving sufficient material in said portion intact. The sides of the piece cut out form substantially an angle equal to 180 degrees minus the angle of the desired corner. Thus, for a 90 degree angle, the piece the sides of which form approximately 90 degrees is notched out. If the molding is to make 120 degrees angle, the piece cut out should be 60 degrees, etc.

Thereupon, the molding is bent, and the edges thereof at said notches are brought together. The bending is preferably done in a suitable die to prevent the corners of the molding from coming to a sharp vertex on a line, with the metal of the molding at the vertices of the notches tending to protrude sidewise. It is preferable to impart a slight radius such as $\frac{1}{16}''$ to the interrupted metal at the corner of the molding.

Thereupon, the notch joint intended to be on the inside of the door is welded in a manner to deposit substantial amount of metal over the line of juncture of the edges to overlap both edges and bridge the same to impart sufficient strength to the joint. Thereupon, the side of the molding intended to be on the outside of the door is soldered. It is preferable to heat the solder sufficiently and to back up the joint from the inside of the molding in a manner to permit the solder to run inwardly of the molding and spread on the inner surfaces thereof at the notch, similarly to the weld on the outside of the molding, in order to increase the strength of the joint. Thereupon, the soldered joint is filed off and scraped smooth. The welded joint being on the inside of the door need not be cleaned particularly clean unless special conditions so require.

In accordance with the invention I provide a molding 9 of a substantially U-shape cross section, with the edges thereof being bent upon themselves as shown at 10 and 11. To form the corner, the sides of the molding are notched as indicated at 12 and 13. It is important for the purpose of the present invention that sufficient metal is left in the connecting portion 13 of the molding such as indicated at 14 for the purposes of the present invention as explained above. The side 15 of the molding is intended to be on the outside of the door, while its side 16 is intended to be on the inner side of the door.

Figure 4:
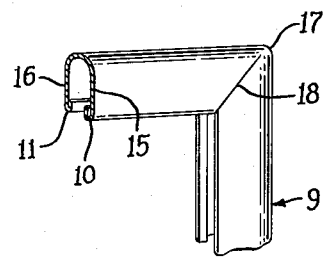

After the molding is notched as described above, it is bent longitudinally to form a 90 degree angle, as shown in Fig. 4. Said bending is done with some stretching of the portion 14 to effect bending thereof on a certain radius such as $\frac{1}{16}''-\frac{1}{8}''$, as indicated at 17 in Fig. 4. In the process of such bending the edges of the molding at the notches 12 and 13 are brought together. Thereupon, a weld is effected along the line of juncture 18 in a manner to deposit sufficient amount of metal to bridge the joint as indicated at 19. By virtue of such expedient the strength of the joint at the line 18 is made greater than that of the metal of the molding, in spite of the fact that the metal of the molding may be as thin as .010" and does not provide sufficient area for an abutting joint.

The molding is next turned over and is soldered on the face of it, i. e., the side intended to be on the outside of the door. It is desired to make the solder build up on the inside of the molding. Therefore, such soldering may be done from the inside of the molding providing, however, the solder runs through the joint toward the outside to cover the place of juncture sufficiently to provide excess of metal capable of concealing the line of juncture after it is filed and scraped.

It will now be understood in view of the foregoing that uninterrupted metal at the rounded corners 17 and the weld 19 provides sufficient strength in the joint and, therefore, the soldered joint on the face of the molding is intended primarily to conceal the place of juncture.

By providing a radius in the portion 17 as explained, scratching of hands and tearing clothing by the sharp corners of the molding is eliminated. The molding at such corners is strong, smooth, and does not betray presence of a joint.

Figure 3:
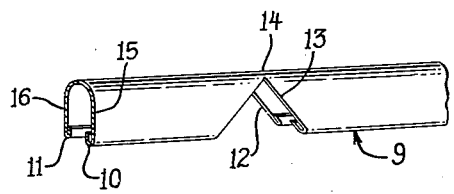
Figs. 3-5 illustrate steps of forming a 90 degree angle corner in the molding.
Figure 5:
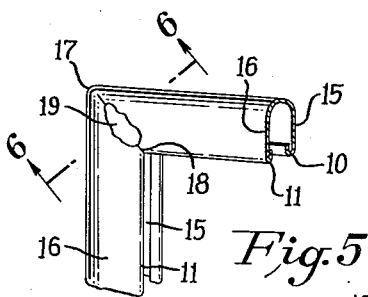
Figure 6:
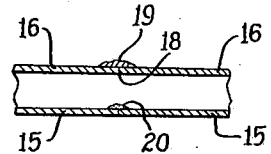
Fig. 6 is a sectional view taken in the direction of the arrows on the section plane passing through the line 6—6 of Fig. 5.
Figure 7:
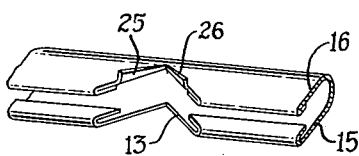
Fig. 7 is a perspective view similar in part to Fig. 3 but showing the molding notched with the edges of the molding at the notch on the side of the molding intended to cover the inner edge of the door, being turned up to increase the strength of the joint after being welded together.
Figure 8:
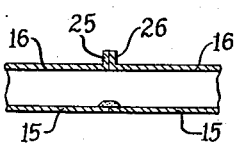
Fig. 8 is a view similar in part to Fig. 6 and showing the molding bent for welding.

Figs. 7 and 8 illustrate steps similar to those shown in Figs. 3–5 but with the edges of the molding at the notch being turned outwardly as indicated at 25 and 26. When the molding so prepared is bent, the turned up edges 25 and 26 come together as shown in Fig. 8 and provide increased area for the weld even if some of the metal is consumed and becomes part of the weld.

Under certain conditions turning up edges may be done inwardly of the molding to provide a shallow groove adapted to be filled with weld metal from a welding rod. Similar expedients may be employed on the face of the molding, and either soldering, brazing or welding may be used.

There is thus provided an improved ornamental and protective molding and a method of making the same whereby the objects of the present invention listed above and numerous additional advantages are attained.

I claim:

In a method of making trim molding for trailing edges of a vehicle door, said edge including a ninety degree corner, the steps of notching out wedge-shaped pieces from the molding at the locality of the intended corner therein leaving the closed end of the U cross section intact, bending the molding at the notches to form a corner and to impart thereto a transverse predetermined radius disposed wholly within the general contour of the formed angle, applying an overlapping weld at the notch seam on the outside of the molding but at the side of the molding intended to overlie the inner side of the door edge for imparting strength to the seam, and applying solder from the inside of the U to the line of juncture of the edges at the other notch seam, and smoothing the resulting soldered seam.

References Cited in the file of this patent

UNITED STATES PATENTS

| | | |
|---|---|---|
| D. 172,414 | Adell | June 15, 1954 |
| 943,370 | Prahar | Dec. 14, 1909 |
| 1,836,354 | Abrams | Dec. 15, 1931 |
| 2,045,770 | Golden | June 30, 1936 |
| 2,119,500 | Quigan | May 31, 1938 |
| 2,139,312 | Mullens | Dec. 6, 1938 |
| 2,219,595 | Lang | Oct. 29, 1940 |

FOREIGN PATENTS

| | | |
|---|---|---|
| 707,457 | Germany | June 23, 1941 |